No. 692,662. Patented Feb. 4, 1902.
M. VAN DEN HEUVEL.
MACHINE FOR MAKING STRAW BOTTLE COVERS.
(Application filed Nov. 6, 1900.)
(No Model.) 5 Sheets—Sheet 1.
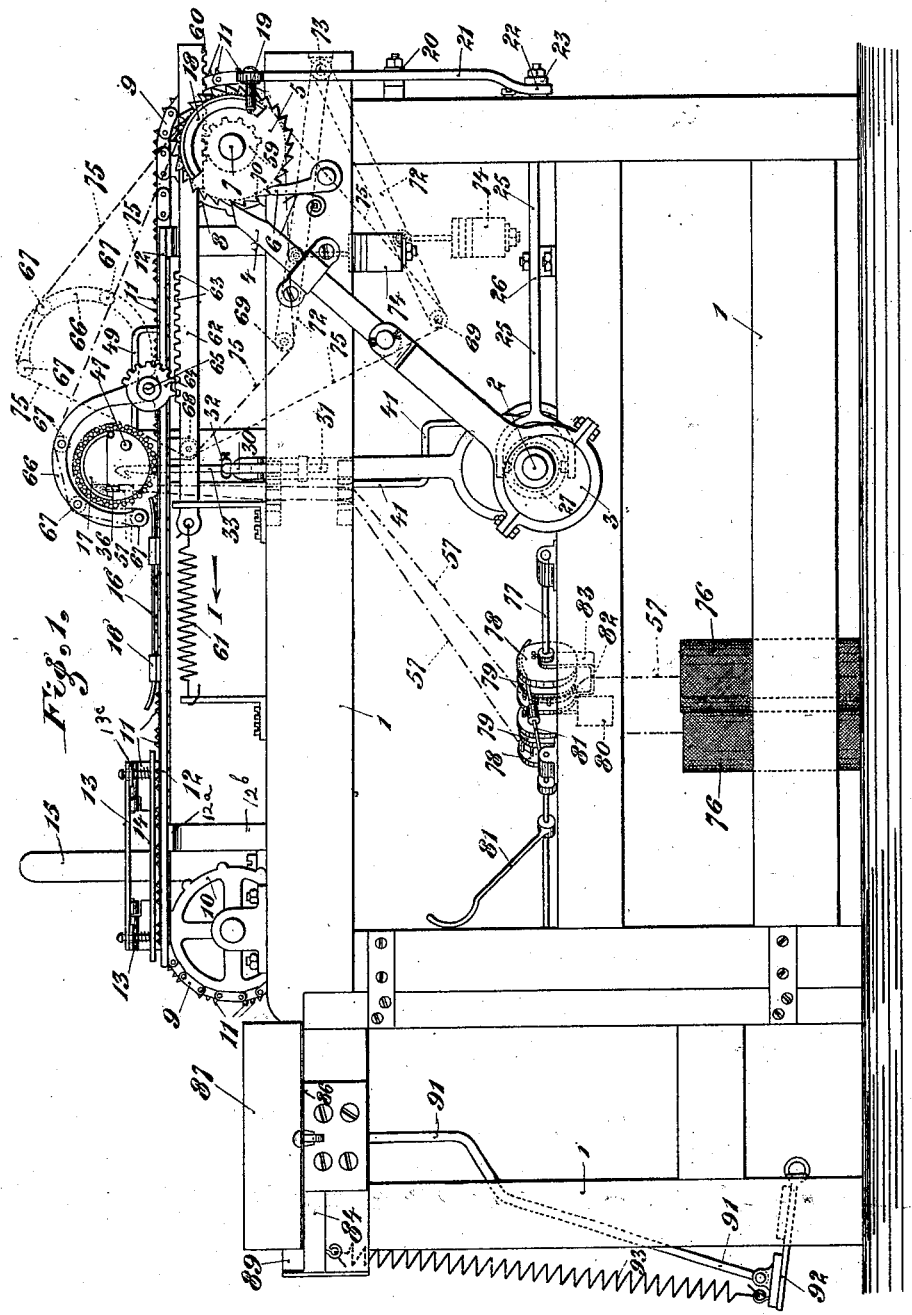

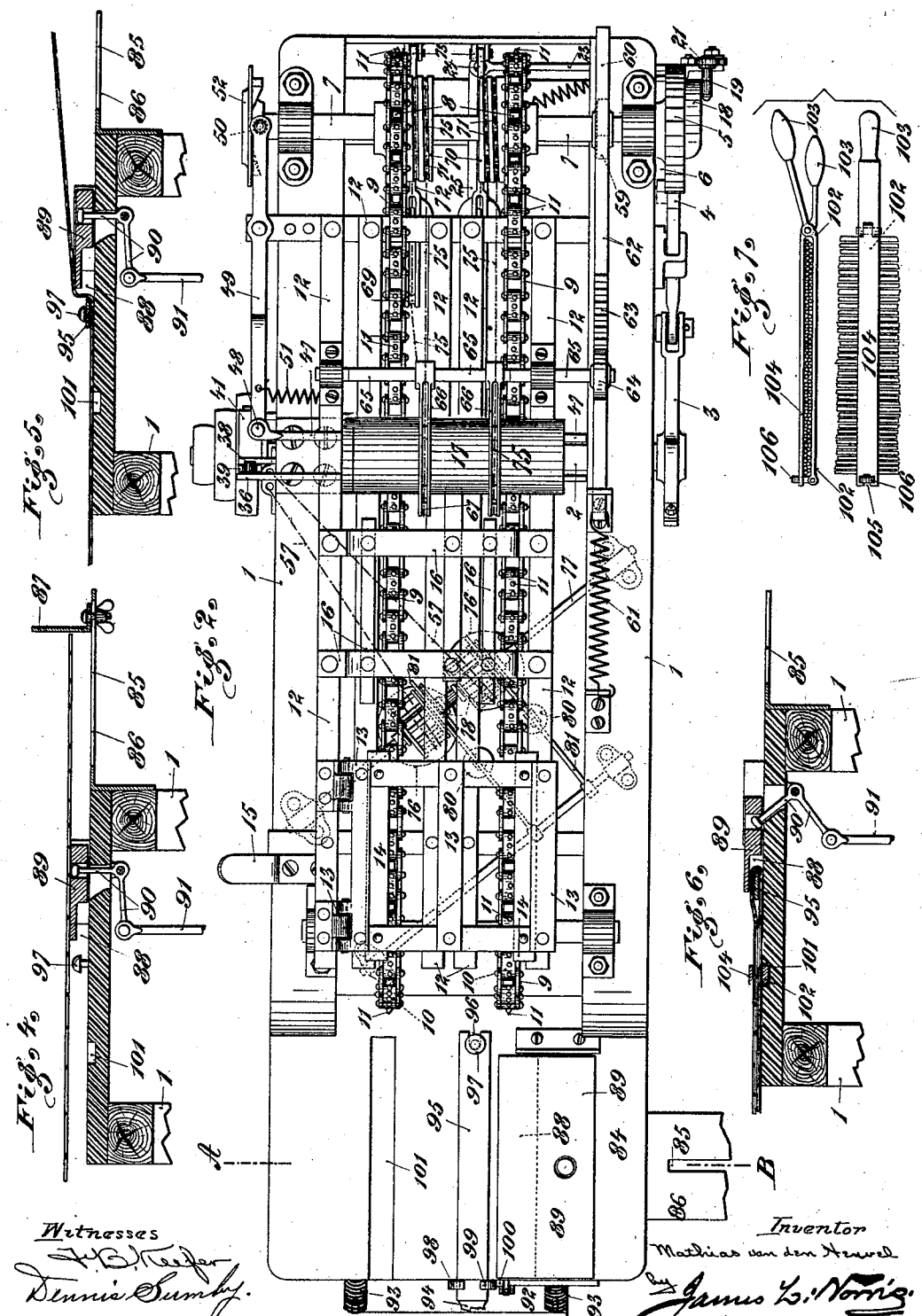

No. 692,662. Patented Feb. 4, 1902.
M. VAN DEN HEUVEL.
MACHINE FOR MAKING STRAW BOTTLE COVERS.
(Application filed Nov. 6, 1900.)
(No Model.) 5 Sheets—Sheet 3.
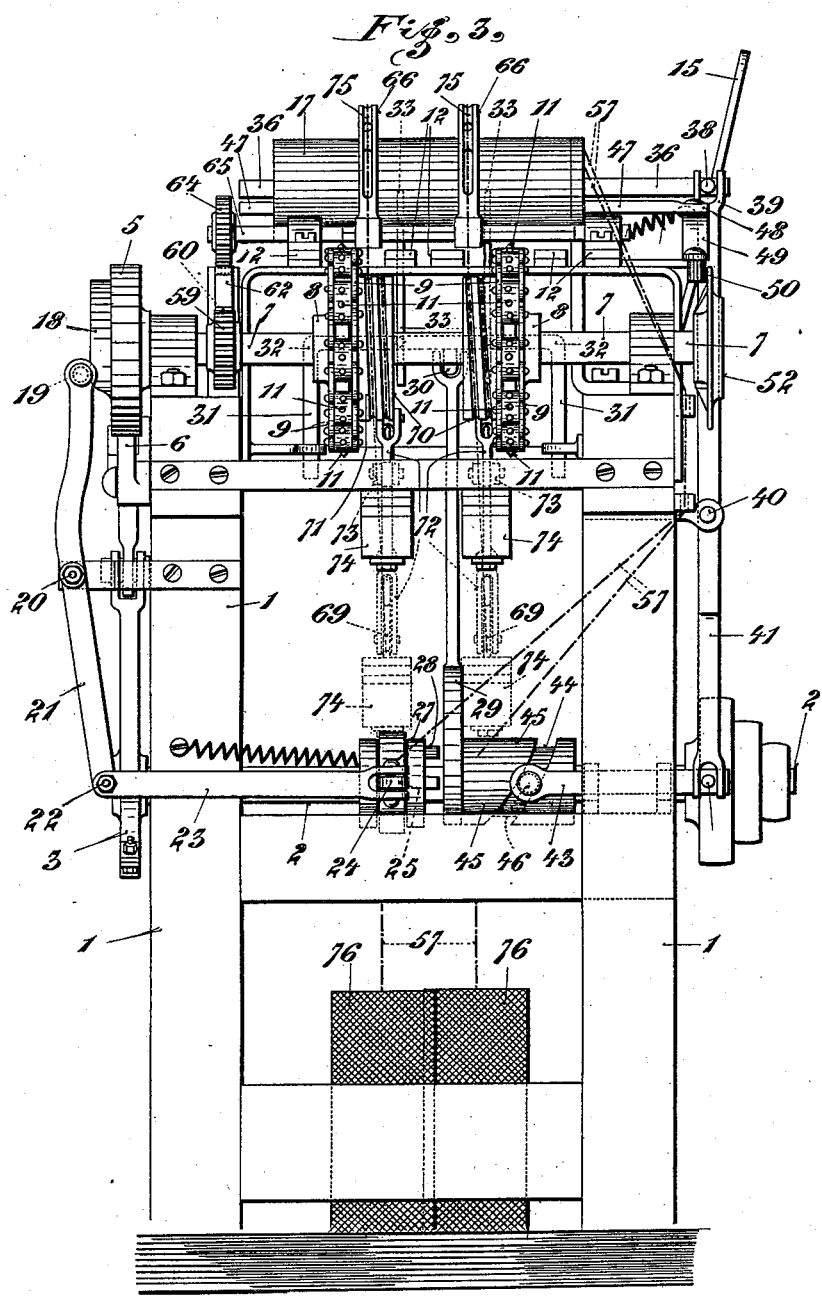

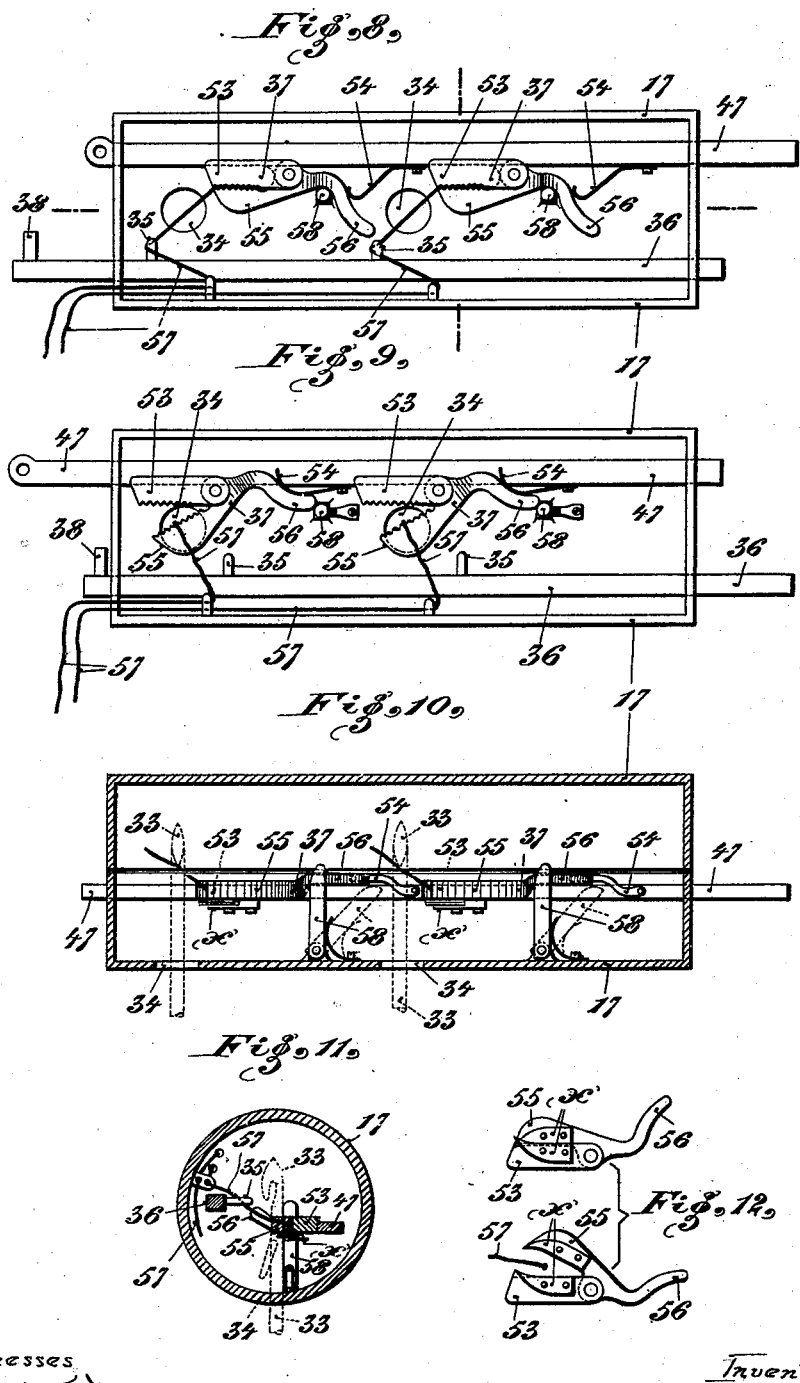

No. 692,662. Patented Feb. 4, 1902.
M. VAN DEN HEUVEL.
MACHINE FOR MAKING STRAW BOTTLE COVERS.
(Application filed Nov. 6, 1900.)
(No Model.) 5 Sheets—Sheet 5.
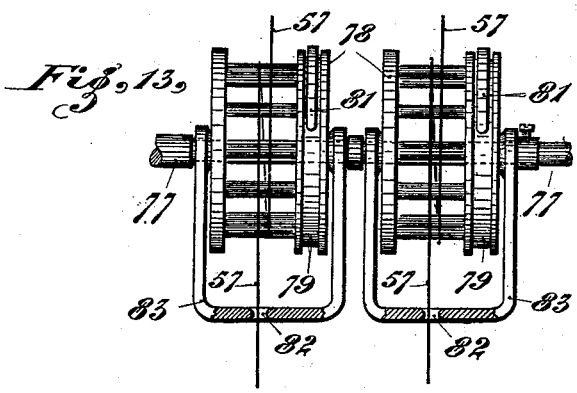
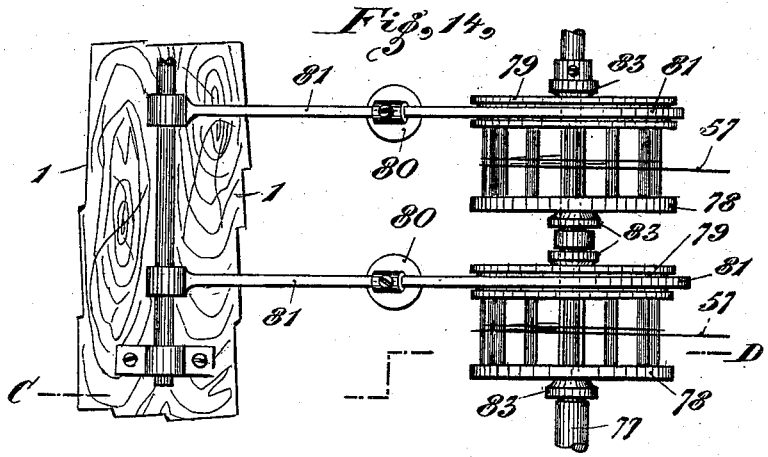
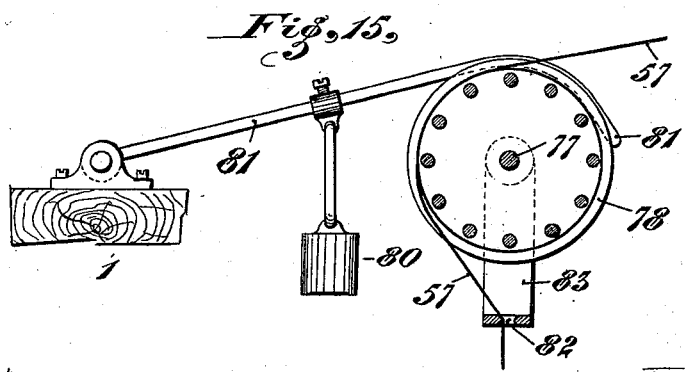
Witnesses
Inventor
Mathias van den Heuvel
by James L. Norris
atty

UNITED STATES PATENT OFFICE.

MATHIAS VAN DEN HEUVEL, OF GANGELT, NEAR GEILENKIRCHEN, GERMANY.

MACHINE FOR MAKING STRAW BOTTLE-COVERS.

SPECIFICATION forming part of Letters Patent No. 692,662, dated February 4, 1902.

Application filed November 6, 1900. Serial No. 35,665. (No model.)

*To all whom it may concern:*

Be it known that I, MATHIAS VAN DEN HEUVEL, manufacturer, a subject of the Queen of the Netherlands, residing at Gangelt, near Geilenkirchen, in the Kingdom of Prussia and German Empire, have invented certain new and useful Improvements in Machines for Making Straw Bottle-Covers, of which the following is a specification.

My invention relates to a machine so constructed as to overcome all drawbacks and imperfections known on other machines existing—in other words, to create an exceedingly effective machine for the production of straw bottle-covers which without any temporary stoppage of the operating-shaft will work continuously and automatically—i. e., will automatically transport a previously-prepared straw mat or layer of straws to the sewing apparatus, sew the same, and simultaneously form the straw mat into a cylindrical cover and sew the same in such a manner that the sewing cannot come undone, and finally automatically effect the cutting off of the sewing-thread after having finished sewing the cover, thereby rendering it free to be drawn from the cylinder upon which it was formed.

The machines at present in use or intended for the manufacture of straw envelops or cases all suffer from several drawbacks and imperfections. The various operations—such as the coupling and uncoupling of the driving parts, the transport device, the sewing apparatus, the devices for cutting and seizing the thread, and forming the sleeve-like cover—have all to be attended to more or less by hand.

It is an important feature of my invention that the operator attending the machine is employed only with the preparation of the straw mats by doubling them before they are sewed. In consequence of such a saving of manual labor the output of such a machine is very great, for while one straw mat is being sewed and formed into a cylinder the operator prepares the straw for the next cover—i. e., folds the straws and places them in the machine—while during the transport of the straw mat thus placed in position toward the sewing device he draws the fully-sewed cover off the cylinder. In this manner a single operator is sufficient to serve and to attend to the machine, for which work several operators have been required in the case of hitherto-known machines of this kind, while twice and three times the amount of time has been required to produce similar output.

In the drawings, Figure 1 is a side elevation of the machine. Fig. 2 is a top plan view of the machine. Fig. 3 is an end elevation. Figs. 4, 5, and 6 are cross-sections on the line A B of Fig. 2, showing the straw-folding device in its various working positions, while Fig. 7 shows the tongs device for transporting the straw mats. Figs. 8, 9, 10, and 11 illustrate the interior arrangement of the cylinder employed in the circular sewing of the covers and represent various working positions of the parts. Fig. 12 refers to a detail of the scissors X on the thread-grippers for cutting the thread when a straw envelop is finished. Figs. 13, 14, and 15 show in elevation, plan view, and cross-section, on line C D, Fig. 14, respectively, the thread-reels and their brake devices as employed in the present machine.

The construction and operation of the machine are as follows:

On a machine-frame 1, of metal or wood, is horizontally arranged an operating-shaft 2, driven either by hand or power. At one end of the shaft is keyed an eccentric 3, which actuates by means of a pawl-tooth 4 a toothed wheel 5, and keyed at the end of a horizontally-arranged auxiliary shaft 7 and provided with a spring-controlled pawl 6 to prevent any movement of the said wheel 5 in a reverse direction. On this auxiliary shaft 7 are also keyed at a suitable distance from each other two chain-wheels 8 8, gearing, by means of a chain 9, with other chain-wheels 10, rotatably mounted at the other end of the machine. The endless chains 9 are provided in known manner with spikes or projections 11, directed upward and placed at suitable intervals, the spikes being intended to engage the straws composing the mat and to carry the mat forward as the chain moves along. The upper halves of the chains move between a kind of grating arranged on the frame of the machine and consisting of a number of longitudinally-arranged rails 12, supported upon the cross-strip 12ª, secured to the standards 12ᵇ, mounted on the frame of the machine and on which the previously-prepared straws are placed and move forward toward the sewing-cylinder. The grating is provided with a presser-frame 13, which turns on hinges 13ª, secured to one of the strips 12, and can be closed down on the previously-prepared straws placed on the grating—i. e., on the conveying or transporting chains 9, as shown in Fig. 1. The frame 13 presses the straws against the spikes 11 of the chains and comprise a rigid upper section and spring-pressed lower section, the latter being slidably connected to the upper section by the bolts 13ᵇ, each carrying a coiled tension-spring 13ᶜ. (See Fig. 1.) The frame 13 is supported when raised and turned back against an upright rail 15, secured to one side of the frame of the machine. By actuating the operating-shaft 2 the chain 9, carrying the straw mat, is intermittently moved forward by means of the pawl 4, actuated by the eccentric 3, and the wheels until the mat passes under a spring-frame 16, fixedly arranged on the frame 12. The object of the frame 16 is to guide and introduce the straw mat exactly below the cylinder 17, around which the mat is sewed as soon as its forward end reaches the perpendicular central plane of the cylinder. This effect is produced in the following manner: The outer face of the wheel 5 is provided with a semicircular projection or cam 18, made of, say, a suitably-bent angle-iron, which cam-surface ceases to be in contact with a guide-roller 19 the moment the straw mat has reached the vertical plane of the cylinder, after which the said roller 19 moves on the plane face of the wheel 5. The guide-roller 19 is arranged at the upper free end of a lever 21, pivoted at 20 on the machine-frame. The lower end of this lever 21 is connected at 22 with a bar 23, which at 24 communicates with a spring-controlled lever 25, pivoted at a point 26 on the machine-frame and intended to act as an uncoupling device. This device is in gear with a groove in a sleeve 27, mounted on the driving-shaft 2, so as to rotate with it while being axially displaceable on it. This sleeve 27 carries on its inner face a pin 28, adapted to enter a hole in a needle-operating eccentric 29, loosely mounted on the operating-shaft, which eccentric 29 thus participates in the rotation, Figs. 1, 2, and 3, during the time the guide-roller 19 travels on the plane face of the wheel 5. This will last until the straw mat has been sewed all around, three or more stitches being added beyond the point where the two ends of the mat meet. At the same moment that this is accomplished the roller 19 meets the projecting surface 18, and being deflected by it the sleeve 27 is disengaged from the eccentric 29 by the action of the coupling-lever 25, bar 23, and lever 21, in consequence of which the needle-eccentric will remain stationary until the roller 19 has again left the cam 18 and reached the plane surface of the wheel 5.

The needle-eccentric 29 is articulated at 30 to a frame 31, vertically guided in the machine-frame 1. This frame carries the required number of the barbed needles 33, fixed to the upper cross-rail 32 of the frame 31. The number of needles corresponds to the number of lines of stitches in the straw covers. The needles 33 pass through orifices 34, Figs. 8 and 10, in the sewing-cylinder 17, above which the sewing-thread is held under tension below the limit of upward movement of the needles. This tension of the thread is effected by means of thread-guides 35, fixed on a rail 36, longitudinally displaceable in the cylinder 17, while the ends of the thread are held by thread-grippers 37, Figs. 8 and 9. The rail 36 is provided at its end with a pin 38, engaged by a fork 39, forming the upper end of a lever 41, pivoted at 40 on the machine-frame. The lower end of this lever 41 is also forked and engages a pin 42 on a bar 43, horizontally mounted in the machine-frame. The other end of this bar 43 is provided with a guide-roller 46, engaging a cam-groove 44 in a sleeve 45. The latter is fixedly connected with the needle-eccentric 29 and is also loosely arranged on the operating-shaft 2, in consequence of which the two devices move together. The reciprocation of the bar 47, carrying the thread-grippers 37, which bar is also horizontally movable within the cylinder 17, is secured at the right moment by an arrangement according to which the end 48, Figs. 2 and 3, of the bar 47 is articulated to a lever 49, the free end of which is provided with a guide-roller 50, constantly pressed against a cam-disk 52, keyed on the auxiliary shaft 7, Figs. 2 and 3, by a spring 51, one end of which is connected with the lever 49, while the other end is secured to the machine-frame.

The thread-grippers 37 consist of jaws 53, fixedly arranged on the bar 47, and movable jaws 55, controlled by springs 54. The movable jaw 55 of each gripper terminates in a curved lever or tail 56, which when the thread-gripper moves toward the thread 57 slides against a pin 58, in consequence of which the gripper opens and surrounds the thread and closes on it when the end of the lever leaves the pin 58. During the reverse movement of the bar 47 the thread-grippers 37 and the curved tails 56 of the movable jaws 55 pass over the pins 58, which yield in this direction, and the pincers remain closed until the sewing of another circular envelop is finished, when the sewing-thread is cut by the knife X, Fig. 12, while the end of the thread itself is securely held for the purpose of serving to sew the next envelop. The pins 58 are controlled by or mounted on springs and return to their vertical position as soon as the gripper-tails 56 have passed over them, Figs. 8, 9, 10, and 11.

In order to insure the straw mat being wrapped around the cylinder 17 during the sewing operation, the following means have been devised: On the auxiliary shaft 7 is keyed a partially-toothed wheel 59, gearing with the lower series of teeth 60 on a rack-bar 62, horizontally movable in the machine-frame and drawn toward the left by a spring 61. An upper series of teeth 63 on the same bar 62 gears with a similarly-constructed wheel 64, keyed on a shaft 65, rotatorily arranged on the grating 12. On this shaft 65 are keyed two arched arms 66, provided with a number of cord-guide rollers 67. Over these rollers passes an endless cord or thin rope 75, made of suitable material, which also passes over a roller 68, arranged on the grating, over another roller 69, and thence several times around a drum 70, Figs. 1 and 2, keyed on the auxiliary shaft 7 and provided with grooves 71, arranged in the manner of a screw-thread, into which the rope enters, Figs. 1, 2, and 3. The rollers 69 are arranged at the free end of a lever 72, pivoted at 73 to the machine-frame and weighted by weights 74 for the purpose of keeping the cord or rope 75 in a state of constant tension. At the moment when the straw mat about to be sewed reaches the cylinder 17 the movement of the toothed bar 62 begins, the teeth of the partially-toothed wheel 59 being at that moment in gear with it. The toothed wheel 64 is thus involved in the movement, and the arched arms 66 gradually place themselves, together with their guiding-cord 75, over the cylinder 17, while the weighted lever 72 is raised, in consequence of which the portion of the straw envelop already sewed is wrapped around the cylinder as it travels forward under the cylinder, Fig. 1. As soon as the straw mat covers the whole cylinder and a few more stitches are given the engagement of the teeth of the wheel 59 with the rack-bar 62 ceases. The rack-bar 62 becoming free is drawn back in the direction indicated by the arrow 1 by the spring 61, the wheel 64 participating in the movement, in consequence of which the arms 66 revert to their original position (indicated by the dotted lines in Fig. 1) and the cord 75 occupies the position indicated by the dotted lines under the influence of the weighted lever 72.

In order to insure that the sewing-thread 57 is always drawn from the bobbins 76 and to prevent the formation of knots or breaking of the thread, a thread-guiding device has been devised for this machine consisting of a reel 78, loosely mounted on a shaft 77 and provided at one side with an annular groove 79, on which is applied a brake 81, adjustably weighted, as at 80. The thread 57 passes through an eye 82 in an arch 83, swinging loosely on the shaft 77, which easily follows the movement of the thread. The sewing-thread 57 passes once around the reel 78, forming thus a kind of loop, and is thence passed through several guides suitably arranged on the machine-frame to the sewing-cylinder 17, Figs. 1, 2, 13, and 15. There are as many of these devices arranged on the machine as there are sewing-threads or lines of stitching in the covers.

The preparation and folding of the material for the straw mats are effected in the following manner: At the front end of the machine is a work-table 84, having at its side a plate 86, provided with a longitudinal slot 85, in which is fixed an adjustable upright or block 87. On the table is arranged a horizontally-movable plate 89, provided with an undercut recess 88, which plate is adapted to be moved by a bell-crank lever 90, pivotally mounted on the machine-frame 1. This bell-crank lever 90 is movably connected at one end to the plate 89 and at the other end to a rod 91, extending downward. The lower end of this rod is hinged to a treadle 92, suitably mounted on the machine-frame and connected with a spring 93, which tends to maintain it in a raised position. Close by the side of the plate 89 is a rail 95, provided with a handle and capable of being secured at the other end by engaging a slot 96 therein under the head of a peg 97, the front end being secured by means of hooks or catches 98 and 99, of which the first is fixedly arranged on the operating-table and the latter articulated on the same and maintained by a spring under it parallel to the hook 98. By the side of the rail 95 is a long groove 101 in the table, intended to receive the shank 102 of a tongs-shaped straw-holder. The other shank 104, also provided with a handle 103, has at its end a slot 105, intended to receive a locking-catch 106, hinged to the end of the other shank 102, whereby the holder can be locked, Fig. 7. The working of this portion of the machine and the method of working and attending the machine in general may be described as follows: The straws cut to the length required are placed and spread out across the table 84, their ends being placed against the upright 87 in order to keep them uniform and fix the proper length relatively to the folding-plate 89. The rail 95 is next fastened down upon them by placing its slot under the head of the pin 97, in consequence of which the straws will be pressed against the working-table 84, the forward end of the rail 95 being fixed and locked by the hooks 98 and 99, Fig. 5. This having been done, the treadle 92 is pressed down, whereupon the folding-plate 89 will be pushed toward the bar 95, thereby bending the straws in half and folding one half over the other, Figs. 5 and 6, after which the plate 89, the bell-crank lever 90, connecting-rod 91, and treadle 92 return to their original position under the action of the spring 93. The lower shank 102 of the tongs-shaped holder is now inserted in the longitudinal groove 101 under the straws, the other shank 104 being kept open or upright, after which the latter can be closed down over the straws and the locking device 106 of the shank pressed into the corresponding recess of the shank 104, in consequence of which the straws now forming a mat of a certain length are immovably fixed between the shanks of the holder, Figs. 6 and 7. The clamping-rail 95 is now withdrawn by opening the hook 99 and withdrawing the rail from under the head of the pin 97, after which the straw mat thus folded is ready to be placed on the machine. This is done by raising the frame 13 against the upright rest 15 and placing the straws by means of the holder over the grating 12 on the transport-chains 9 of the machine. The frame 13 is then closed, and by a slight pressure on the handles of the holder the locking device 106 will become free automatically, since the elasticity of the straws held between the shanks and tending to separate them is counteracted by such pressure. The holder can now be withdrawn, and the straw mat is now on the transport device of the machine. The chains, having an intermittent motion produced by the eccentric 3, pawl 4, wheel 5, and the auxiliary shaft 7, carry the straw under the spring-controlled frame 16, which guides the straw to the sewing-cylinder. When the front edge of the straw mat arrives under this cylinder, the guiding-roller 19, traveling on the cam projection 18 of the wheel 5, leaves the same, whereupon the clutch device 21 23 25 of the needle-eccentric is operated, in consequence of which the coupling of the needle-eccentric with the operating-shaft is effected, thereby producing the vertical reciprocating movement of the needles, by which the sewing of the cases is obtained. The sewing process is accomplished by the known chain-stitch formation, while the straw mat under the influence of the endless cord 75 and the arched guide 66, actuated thereby, travels around the cylinder until the ends meet or overlap, after which a few more stitches are made with a view of preventing any unloosening of the thread. In order to provide the straw sleeve after being finished with further stitches, only those parts of the machine which operate the needle-eccentric must receive the peculiar form, so as to lengthen the sewing operation according to the number of stitches to be made. Therefore only the part 18 of the ratchet-wheel 5 must be accordingly made longer or shorter. This being done, the bar 47 of the sewing-cylinder is moved, the thread-grippers are opened, while on the return movements of the bars 47 the said grippers will firmly hold the sewing-thread, while the knives arranged below the grippers cut the thread of the finished envelop. The knives *x* come into action on the closing of the thread-grippers 37—*i. e.*, at the end of the finishing of a straw sleeve. By cutting off the thread of the finished sleeve and closing the thread-grippers the end of the thread is held for the next sleeve until some stitches are sewed, whereupon by a short movement of the lever actuating upon the grippers the latter are slightly loosened, thereby loosening the threads until the sleeve is almost finished. By a repeated movement of the rod 47 and under influence of the spring-lever 58 the thread-grippers will advance in an open position toward the threads, grip the latter, and upon the return of the rod 47 cut off the threads and hold the ends of the threads remaining in the machine until again some stitches are made in the next straw sleeve. During the sewing operation, therefore, the thread is not held by the grippers, but only at the beginning of the sewing process and at the end of the latter—*i. e.*, at the beginning the thread is held until some stitches are formed, and at the end it is caught for the purpose of being cut off and held tight for the next straw mat to be sewed. During this sewing operation the attendant prepares the straw for the next cover to be made by the machine, and while this is traveling toward the sewing-cylinder he has time to draw the finished envelop from the cylinder. At the same moment at which the sewing is terminated the guide-roller 19 again ascends the cam projection 18 of the wheel 5, whereupon the clutch device for the needle-eccentric is again actuated, in consequence of which the sewing stops until the next layer of straw has reached the lowest point of the sewing-cylinder, at which moment the guide-roller 19 again leaves the cam projection 18, and so on.

Having now particularly described and ascertained the nature of my invention and in what manner the same is to be performed, I declare that what I claim is—

1. In a machine of the kind described means for guiding the straws while being sewed around the sewing-cylinder comprising movable arched guides an endless cord or rope kept taut by a suitably-arranged weight, said guides being mounted on a rock-shaft, provided with a partially-toothed gear-wheel, adapted to engage an upper series of teeth on a double rack-bar, the lower series of teeth of which gear with a second partially-toothed wheel keyed on the auxiliary shaft the gearing being so arranged that the rack-bar is withdrawn to its initial position by a spring the moment it ceases to gear with the wheel on the auxiliary shaft, in consequence of which the other gear-wheel and the guides are returned to their initial position, substantially as described.

2. In a machine for manufacturing straw bottle-covers, a sewing-cylinder, means for conveying the cover-blanks to said cylinder, mechanism for sewing the cover-blanks, means for guiding the sewed blanks around said cylinder, means for automatically operating said guide means, means for cutting the thread when the cover has been formed, means for automatically and intermittently operating said sewing mechanism, and means for intermittently operating the said conveying means.

3. In a machine for manufacturing straw bottle-covers, sewing mechanism for the cover-blanks, a pair of arched arms for guiding the blanks while being sewed, means for automatically operating said arms, means for conveying the cover-blanks to said sewing mechanism, a presser-frame engaging the cover-blanks upon the conveying means, operating means for said sewing mechanism, and operating means for said conveying means.

4. In a machine for manufacturing straw bottle-covers, a sewing-cylinder, a longitudinal reciprocating bar mounted therein, guide-pins for the thread mounted on said bar, needles operating in said cylinder, needle-levers, operating means therefor, means for conveying cover-blanks to said cylinder, a pair of arched arms surrounding said cylinder for guiding the sewed blank, means for automatically operating said arms, a presser-frame engaging the blanks upon said conveyer, and operating means for said conveyer.

5. In combination, in a machine of the character described, a sewing-cylinder, a needle-thread looper, means for automatically and intermittently operating said looper, means for cutting and gripping the sewing-thread, means for automatically and intermittently operating said cutting and gripping means, sewing mechanism, operating means therefor, means for conveying the cover-blanks to the sewing-cylinder to be sewed, means for intermittently operating the same, a pair of arched arms for guiding the sewed cover around the sewing-cylinder, and means for automatically moving said arms into and out of operative position.

6. In combination, in a machine of the character described, a sewing-cylinder, a needle-thread looper, means for automatically and intermittently operating said looper, means for cutting and gripping the sewing-thread, means for automatically and intermittently operating said cutting and gripping means, sewing mechanism, operating means therefor, means for conveying the cover-blanks to the sewing-cylinder to be sewed, a pressure device for causing the blanks to engage the conveying means, means for intermittently operating the same, a pair of arched arms for guiding the sewed cover around the sewing-cylinder, and means for automatically moving said arms into and out of operative position.

7. In a machine for manufacturing straw bottle-covers, a sewing-cylinder, means for conveying the cover-blanks to said cylinder, mechanism for sewing the cover-blanks, means for guiding the sewed blanks around said cylinder, means for automatically moving said guide means into operative position, means for automatically moving said guide means to inoperative position, means for automatically and intermittently operating said sewing mechanism, and means for intermittently operating said conveying means.

8. In a machine for manufacturing straw bottle-covers, a sewing-cylinder, means for conveying the cover-blanks to said cylinder, a pressure device for causing the blanks to engage the conveying means, mechanism for sewing the cover-blanks, means for guiding the sewed blanks around the cylinder, means for automatically moving said guide means to operative position, means for automatically moving said guide means to inoperative position, means for cutting the thread when the cover has been formed, means for automatically and intermittently operating said sewing mechanism, and means for intermittently operating said conveying means.

9. In combination in a machine of the character described, a sewing-cylinder, a needle-thread looper, means for cutting and gripping the sewing-thread, sewing mechanism, means for conveying the cover-blanks to the sewing-cylinder to be sewed, a pressure-frame engaging the blanks upon the conveying means, a pair of arched arms for guiding the sewed cover around the sewing-cylinder, means for automatically moving said arms to operative position, means for automatically moving said arms to inoperative position, and means for automatically operating said conveying means.

10. In combination in a machine of the character described, a sewing-cylinder, an automatically-operating needle-thread looper mechanism, an automatically-operating cutting and gripping mechanism for the sewing-thread, an automatically-operating sewing mechanism, an automatically-operating conveying mechanism for presenting the cover-blanks to the sewing-cylinder to be sewed, a presser-frame engaging the blanks upon the conveying means, an automatically and intermittently operating means for guiding the sewed cover around the sewing-cylinder, automatically-operating means for moving said guide means into operative position, and an automatically-operated means engaging the said guide means for moving the latter into inoperative position.

11. In a machine for manufacturing straw bottle-covers, a sewing-cylinder, an endless conveyer for feeding the cover-blanks to said cylinder, mechanism for sewing the cover-blanks, means for guiding the sewed blanks around said cylinder, means for automatically moving said guide means into operative position, means for automatically moving said guide means into inoperative position, means for operating said guide means, means for intermittently operating said sewing mechanism, and means for intermittently operating said conveyer.

12. In a machine of the character described, a sewing-cylinder, means for feeding the cover-blanks thereto, a sewing mechanism for the cover-blanks, means for guiding the sewed blanks around said cylinder, a spring-return bar engaging with the said guide means for automatically and intermittently operating the latter to bring the same into operative position, means engaging with the said guide means for moving the same into inoperative position after the said guide means has been operated by the said spring-return bar, and means for intermittently operating said feeding means.

13. In a machine for manufacturing straw bottle-covers, a sewing mechanism, a sewing-cylinder, means for feeding the blanks to the sewing mechanism, means for guiding the blanks around the sewing-cylinder, means engaging with the said guide means for moving the same into operative position, means engaging with said guide means for moving the same to inoperative position, a main shaft, and separate connections between the main shaft, sewing mechanism, guide-operating means therefor and feed means for automatically and intermittently operating them.

14. In a machine for manufacturing straw bottle-covers, a sewing-cylinder, sewing mechanism, means for feeding the cover-blanks to the sewing mechanism, means for causing the engagement of the cover-blanks with the feeding means, means for guiding the sewed blank around the cylinder, an automatically and intermittently operating bar engaging with the guide means for moving the latter into operative position, means engaging with the guide means for moving the same into inoperative position, means for automatically and intermittently operating said sewing mechanism, and means for automatically and intermittently operating said conveying means.

15. In a machine for manufacturing straw bottle-covers, a sewing-cylinder, a sewing mechanism, means for feeding the cover-blanks to said mechanism, means for causing the cover-blanks to engage with the feeding means, means for guiding the sewed cover around said cylinder, means for cutting the thread when the cover has been formed, an automatically and intermittently operating bar engaging with the said guide means for moving the same into operative position, means engaging with the guide means for moving the same into inoperative position, means for automatically operating said cutting means, means for automatically operating said sewing mechanism, and means for automatically and intermittently operating said conveying means.

16. In a machine of the character described, a sewing mechanism, means for feeding cover-blanks thereto, a pair of arched arms for guiding the blank while being sewed, a spring-return bar engaging with the arched bars for automatically and intermittently moving the same into operative position, means engaging with the bars and moving the same into inoperative position, mechanism for operating said spring-return bar, mechanism for operating said sewing mechanism, and means for suitably operating said feeding means.

In testimony whereof I have hereunto set my hand in presence of two subscribing witnesses.

MATHIAS VAN DEN HEUVEL.

Witnesses:
   WILLIAM ESSENWEIN,
   PETER LIEBER.